United States Patent
Konetski et al.

(10) Patent No.: US 9,485,579 B2
(45) Date of Patent: *Nov. 1, 2016

(54) SYSTEM AND METHOD FOR INFORMATION HANDLING SYSTEM WIRELESS AUDIO DRIVEN ANTENNA

(71) Applicant: DELL PRODUCTS L.P., Round Rock, TX (US)

(72) Inventors: David Konetski, Austin, TX (US); Pratik M. Mehta, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 448 days.

This patent is subject to a terminal disclaimer.

(21) Appl. No.: 13/868,715

(22) Filed: Apr. 23, 2013

(65) Prior Publication Data

US 2013/0243202 A1    Sep. 19, 2013

Related U.S. Application Data

(63) Continuation of application No. 12/815,676, filed on Jun. 15, 2010, now Pat. No. 8,432,931.

(51) Int. Cl.
| | |
|---|---|
| *H04R 3/12* | (2006.01) |
| *H04W 72/12* | (2009.01) |
| *H04W 28/12* | (2009.01) |
| *H04W 72/04* | (2009.01) |

(52) U.S. Cl.
CPC ........... *H04R 3/12* (2013.01); *H04W 72/1257* (2013.01); *H04W 72/1273* (2013.01); *H04W 72/1289* (2013.01); *H04W 28/12* (2013.01); *H04W 72/0446* (2013.01)

(58) Field of Classification Search
CPC ............. H04W 28/10–28/12; H04W 72/005; H04W 72/042; H04W 72/0446; H04W 72/121; H04W 72/1226–72/1231; H04W 72/1273; H04W 72/1289–72/1294; H04W 74/08–74/0891
See application file for complete search history.

(56) References Cited

U.S. PATENT DOCUMENTS

| | | |
|---|---|---|
| 7,352,332 B1 | 4/2008 | Betts-LaCroix et al. |
| 7,684,333 B1 | 3/2010 | Dasylva et al. |
| 2004/0053526 A1 | 3/2004 | Godfrey |
| 2006/0098626 A1 | 5/2006 | Park et al. |
| 2006/0140186 A1* | 6/2006 | LoGalbo et al. ............. 370/390 |
| 2006/0209892 A1 | 9/2006 | MacMullan et al. |
| 2007/0041397 A1 | 2/2007 | Hwang |

(Continued)

*Primary Examiner* — Michael Thier
*Assistant Examiner* — Eric Myers
(74) *Attorney, Agent, or Firm* — Terrile, Cannatti, Chambers & Holland, LLP; Robert W. Holland

(57) ABSTRACT

Audio information coexists with best efforts data on a wireless network, such as a wireless local area network, by defining a backoff dedicated to communicate of audio information and using undedicated resources to communicate best efforts data. The backoff has a periodic interval that corresponds to the sample rate of the audio information so that a set of audio frame slots communicated at the start of a backoff interval has a length of time to complete communication. The set of audio frame slots has, for instance, an audio frame slot for each audio endpoint interfaced with the network. Periodic backoffs ensures synchronized audio playback by dedicating an antenna to communication of audio frames at the sample rate of the audio information, while supporting best efforts network communication when audio information is not being communicated.

18 Claims, 2 Drawing Sheets

(56) References Cited

U.S. PATENT DOCUMENTS

| | | |
|---|---|---|
| 2007/0165610 A1 | 7/2007 | Tseng et al. |
| 2007/0230389 A1 | 10/2007 | Amann et al. |
| 2008/0049773 A1 | 2/2008 | Utsunomiya et al. |
| 2008/0232285 A1 | 9/2008 | Aad et al. |
| 2009/0175216 A1 | 7/2009 | Bozarth et al. |
| 2009/0213815 A1 | 8/2009 | Sherman et al. |
| 2009/0225790 A1 | 9/2009 | Shay et al. |
| 2009/0240998 A1* | 9/2009 | Nikkila et al. ............... 714/746 |
| 2010/0135318 A1 | 6/2010 | Yin et al. |
| 2010/0142465 A1 | 6/2010 | Medepalli et al. |
| 2011/0032822 A1 | 2/2011 | Soomro |
| 2011/0141969 A1 | 6/2011 | Sridhara et al. |
| 2011/0149795 A1 | 6/2011 | Tanaka et al. |

* cited by examiner

SYSTEM AND METHOD FOR INFORMATION HANDLING SYSTEM WIRELESS AUDIO DRIVEN ANTENNA

CROSS-REFERENCE TO RELATED APPLICATION

This application is a continuation of co-pending application Ser. No. 12/815,676, filed Jun. 15, 2010, which is incorporated herein by reference in its entirety.

BACKGROUND OF THE INVENTION

1. Field of the Invention

The present invention relates in general to the field of information handling system wireless communication, and more particularly to a system and method for information handling system wireless audio driven antenna.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have transformed the way enterprises operate as well as how individuals run households. Initially, information handling systems managed financial information and word processing functions. Since their introduction, the growth of the Internet has made information handling systems one of the primary communication tools of enterprises and households through the use of e-mail and the Internet. More recently, information handling systems have transitioned into the role of entertainment, such as by storing and playing music and movies. As information handling systems have come to manage audio information storage and presentation, end users have sought convenient ways to communicate audio information from an information handling system that generates audio information to audio endpoints that present audio information. One difficulty to deploying audio endpoints is the running of wires between audio sources and audio endpoints. An option to avoid the use of wires is to use wireless communication, such as through a wireless local area network (WLAN) like those defined by IEEE 802.11(b, g or n) or wireless personal area network (WPAN) like Bluetooth. A difficulty with wireless communication of audio information from an audio source to an audio endpoint is that wireless communication tends to have poor quality of service and synchronization coordination needed for audio distribution to multiple audio endpoints, such as multiple speakers that play in stereo.

Recently, audio oriented wireless systems have emerged which address quality of service needs, but compete for bandwidth with data services communicated through the same or similar wireless bands. Generally, wireless networks transmit data on a best efforts basis; however, audio information tends to degrade when sent through best efforts networks because a missing frame of audio information is detectable by an end user listening to an audio presentation. Audio frames typically have a target sample rate or a multiple of a sample rate with the collection of the samples at an endpoint presenting a desired audible sound. In order for audio information to maintain a desired quality, real-time delivery of audio frames synchronized for all end points is desired with a reliable distribution through a wireless communication medium. Existing methods of maintaining reliable audio distribution include adaptive frequency hopping, which attempts to maintain communication of audio information through a clean frequency, channel avoidance, which attempts to maintain a channel free for communication of audio information and MAC address level signaling. A more expensive option is to dedicate an antenna for audio communication, however, the use of existing bandwidths with a dedicated antenna can still have degraded communications due to competition within the frequency band.

SUMMARY OF THE INVENTION

Therefore a need has arisen for a system and method which allows audio information to coexist on a wireless network with best efforts information.

In accordance with the present invention, a system and method are provided which substantially reduce the disadvantages and problems associated with previous methods and systems for communication of audio information through a wireless network. A periodic backoff interval corresponds with the sample rate of audio information. An audio frame is sent through the wireless network at the start of each backoff for a backoff length sufficient to complete the communication of the audio information. The remainder of the audio frame is then used for best efforts network communication.

More specifically, an information handling system is built from plural processing components that cooperate to process information, such as audio information for presentation at audio endpoints, like as speakers. The audio information coexists on a wireless network with best efforts formatted information by defining periodic backoffs during which only or substantially only audio information is sent through the wireless network. A backoff module running on a processor and memory of the information handling system defines the backoff to have a periodic interval that corresponds to the sample rate of the audio information so that an audio frame is communicated across the wireless network at the start of each backoff interval. The backoff has a length sufficient to communicate an audio frame of the quality and the number of slots needed for the audio information. After the length passes and the audio information of the audio frame is communicated, the remainder of time until the start of the next backoff is available for communicating network information on a best efforts basis.

The present invention provides a number of important technical advantages. One example of an important technical advantage is that audio information with real time communication demands coexists with best efforts data on a wireless network. By defining a periodic backoff with an interval that corresponds to the sample rate of audio information, adequate bandwidth is reserved on a real time basis to support an audio stream to one or more audio endpoints, such as speakers. Once audio information is sent for a frame, the remainder of time until the next frame is available to send best efforts data. Synchronized audio information is communicated on a real time basis by reducing interference and bottlenecks that could result from best efforts network traffic so that audio quality at an end point is preserved. A backoff is optionally enforced across a wireless network, such as by communicating the backoff to each device of the wireless network, to maintain a reliable interface of audio information on a real time basis.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Using a backoff at an antenna to enforce exclusive use of the antenna to communicate audio information from an information handling system to audio endpoints through a wireless network during the backoff provides coexistence of audio and best efforts data at the network. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
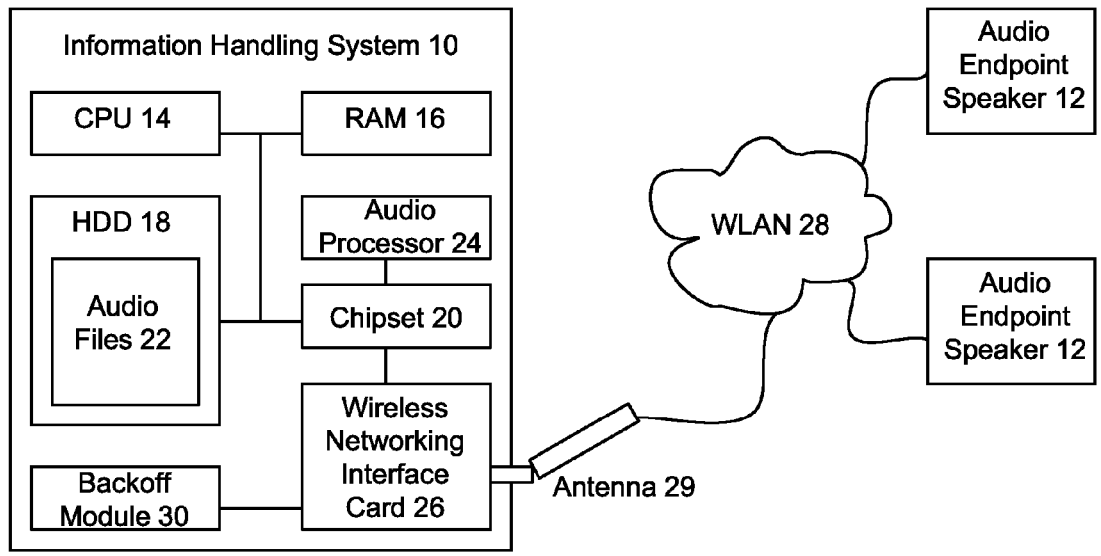
FIG. 1 depicts a block diagram of an information handling system configured to communicate audio information using periodic backoff intervals.

Referring now to FIG. 1, a block diagram depicts an information handling system 10 configured to communicate audio information using periodic backoff intervals. Information handling system 10 is built from plural processing components that cooperate to process information, such as generation of audio information for presentation at audio endpoints like speakers 12. For example, information handling system 10 has a CPU 14 that processes information stored in RAM 16 or a hard disk drive 18. A chipset 20 coordinates the interaction of the processing components at a physical level. In one embodiment, an application executing on CPU 14 retrieves audio files 22 stored in non-volatile memory of hard disk drive 22 and processes audio information of audio files 22 into audio frames for presentation at speakers 12. In an alternative embodiment, an audio processor 24 associated with chipset 20 processes audio files retrieved by CPU 14 from hard disk drive 18 and placed in RAM 16. Audio frames are communicated from information handling system 10 by a wireless network device 26, such as a wireless network interface card, through a wireless network 28, such as a wireless local area network (WLAN) as defined by IEEE 802.11(b, g or n) or a wireless personal area network (WPAN) like Bluetooth.

Audio frames sent through wireless network 28 are synchronized and sent on a real time basis so that the presentation of sounds from speakers 12 is coordinated. In order to ensure that audio frames successfully coexist with other network data that is transmitted on a best efforts basis, a backoff module 30 associated with wireless network interface card 26 dedicates exclusive network use for the audio frames during periodic backoff intervals that correspond to the sample rate of the audio frames and for a length that allows communication of plural audio slots of an audio frame with an audio slot having information for one or more of each audio endpoint during the backoff interval. Backoff module 30 is, for example, a software driver executing on CPU 14 and stored in memory, such as RAM 16, or persistent memory, such as within an operating system stored on hard disk drive 22. Once the backoff length has expired for a backoff interval, the backoff module permits best effort data transmission over wireless network 28 until the next backoff interval period begins. The wireless network thus transitions at each periodic backoff interval to exclusive transmission of audio information on a real time basis for the length needed to communicate an audio frame slot for each audio endpoint, and uses the remaining time until the next interval begins to communicate best efforts network data. In one embodiment, backoff module 30 sets a minimum amount of time for the availability of wireless network 28 for best efforts communication and then sets a quality level for the audio information so that the periodic backoff interval and length allow the set minimum time for best efforts communication of data over wireless network 28. By restricting communications to audio information during a backoff length of time, an antenna 29 sends only audio information transmissions during those times when audio frames are sent on a real time basis so that interference at antenna 29 is minimized. In one embodiment, backoff module 30 provides the periodic backoff intervals and lengths to other wireless devices of wireless network 28 so that the other devices also restrict communications when audio frames are sent.

Figure 2:
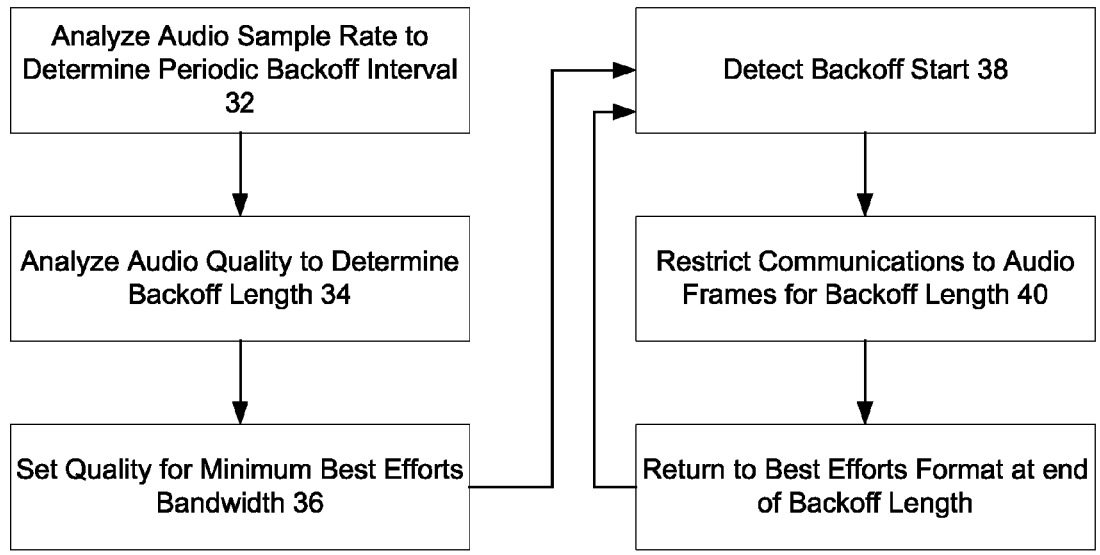
FIG. 2 depicts a flow diagram of a process for communicating audio information using periodic backoff intervals.

Referring now to FIG. 2, a flow diagram depicts a process for communicating audio information using periodic backoff intervals. The process begins at step 32 with analysis of an audio information sample rate for audio frames to be sent over the wireless network in order to determine a periodic backoff interval. The periodic backoff interval corresponds to the real time transmissions needed to match the sample rate of the audio frames. Higher quality sound with greater sample rates will have shorter backoff intervals with more frequent transmissions of audio frames. In one embodiment, buffering of information can be used to send multiple samples of audio data in one audio frame to allow a longer backoff interval with more bits per frame. At step 34, the audio quality, such as bits per sample, is analyzed to determine a backoff length that is sufficient to include a set of audio frame slots sent in a backoff interval. The backoff length will increase as the number of audio frame slots increases, such as with a greater number of endpoints, or with greater audio quality, such as HD quality having a larger audio frame slot for each endpoint compared with CD quality having smaller audio frame slots. At step 36, the backoff interval and length are adjusted in order to ensure a desired minimum bandwidth or transmission time for sending best efforts data. For example, if a minimum setting of best efforts network capacity is not available for a given transmission of audio information, the size of the audio transmission is reduced to leave greater transmission time for best efforts data. For instance, the size of the audio transmission is reduced by reducing the sample rate or audio quality (bits per sample).

At step 38, the start of a backoff interval is detected, such as with the start of audio information transmission through a wireless network. At step 40, communications are restricted at the wireless network to transmissions of audio frames for the backoff length. Restricting communications to exclude all but audio information during the backoff length avoids interference with other transmissions and ensures real time delivery of synchronized audio information. During the periodic backoff interval length, only or substantially only audio information is transmitted through wireless antenna of an information handling system for communication over a wireless network. At step 42, transmissions at the information handling system antenna returns to a best efforts format, such as is commonly associated with wireless local area networks, until the end of the backoff interval period. The process returns to step 38 at the start of the next periodic backoff interval to again initiate communication of audio information. Once communication of audio information is complete, the backoff module ceases backoff intervals so that the antenna communicates at a best efforts format without setting aside time for communication of audio information.

Figure 3:
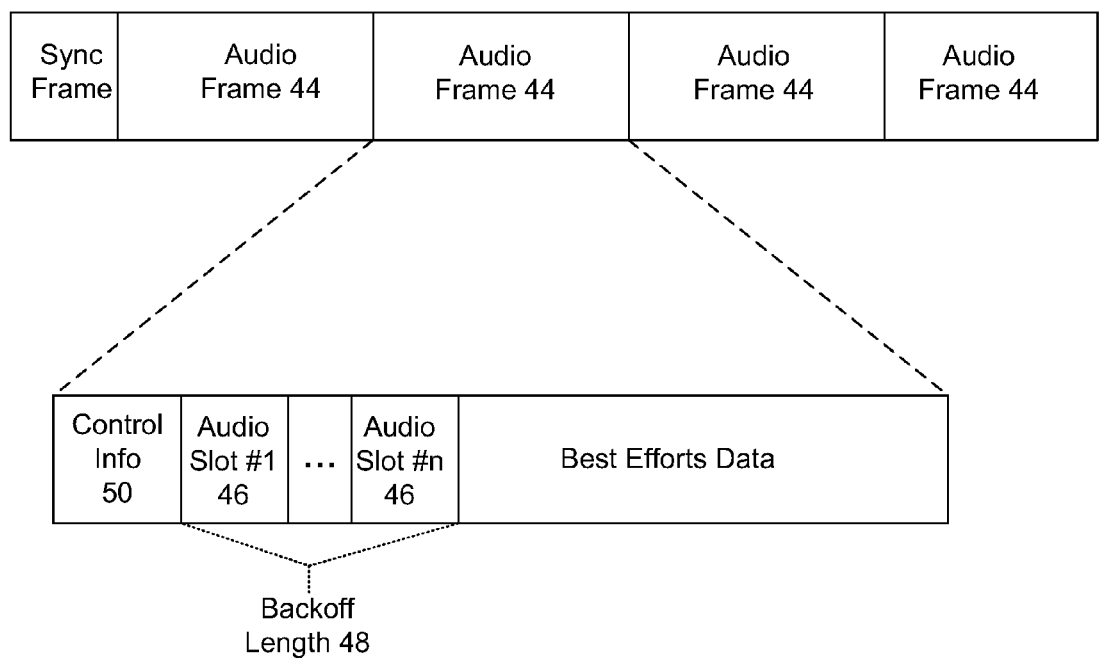
FIG. 3 depicts audio frame slots for plural audio endpoints during a backoff interval.

Referring now to FIG. 3, audio frames 44 having slots 46 for plural audio endpoints during a backoff interval are depicted. In the example embodiment of FIG. 3, the audio frame sample rate is 48 KHz sent across an IEEE 802.11 (n) wireless local area network having a bandwidth of 100 Mbps so that each audio frame has a total duration of 20.83 microseconds with a total potential data load of 2083 bits. A periodic backoff interval of 20.83 microseconds ensures that at the start of each backoff interval an audio frame 44 has audio information for communication across the wireless network. An audio slot 46 carries audio information for an audio endpoint or a set of audio endpoints that use the same data so that an audio slot 46 is sent in each audio frame 44 for each supported endpoint or set of endpoints. In addition, some audio control data or synchronization data 50 may be sent with each frame 44. With CD quality audio information, each audio slot 46 has 32 bits while with HD quality audio information, each audio slot has 128 bits. For a typical setup with four endpoints, four audio slots 46 of information are sent with each audio frame. For a CD quality communication, each audio frame 44 will send four slots 46 of 32 bits each for a backoff length of 128 bits, consuming only approximately 6% of the bandwidth of the frame and leaving 94% of the frame (1955 bits) for best efforts communication. For a HD quality communication, each audio frame 44 will send four slots 46 of 128 bits each for a backoff length of 512 bits, consuming only approximately 25% of the bandwidth of the frame and leaving 75% of the frame (1315 bits) for best efforts communication.

Although the present invention has been described in detail, it should be understood that various changes, substitutions and alterations can be made hereto without departing from the spirit and scope of the invention as defined by the appended claims.

What is claimed is:

1. A method for communicating audio information through a wireless network, the audio information periodically sent as an audio frame, each periodic audio frame including plural audio slots, each audio slot defining audio information for playback at an audio endpoint, the method comprising:
   determining a time interval for sending the audio frame based upon a sample rate of the audio information;
   determining a time period for sending the audio frame by determining the amount of audio data in each audio slot times the number of audio slots;
   communicating each audio frame through the wireless network to plural audio endpoints during the time interval for the time period, the plural audio endpoints presenting sounds in synchronization with each other;
   restricting communication of data other than the audio information during the time interval for the time period;
   communicating data in a best efforts format outside of the time interval for the time period; and
   presenting the audio sounds synchronized at the plural audio endpoints;
   wherein each audio frame has control information to synchronize the presenting of sounds and plural audio slots, each audio slot associated with an endpoint, each time interval communicating one audio frame having the plural audio slots.

2. The method of claim 1 wherein communicating audio frames and communicating data further comprise communicating the audio frames and data with the wireless network through a common antenna.

3. The method of claim 2 wherein the network comprises a wireless local area network.

4. The method of claim 2 wherein the network comprises a wireless personal area network.

5. The method of claim 1 wherein the each audio slot comprises 32 bits of audio information.

6. The method of claim 1 wherein the audio endpoints comprise speakers.

7. The method of claim 1 further comprising:
   setting a minimum time period for communicating data in a best efforts format; and
   adjusting the time interval to maintain the wireless network for communicating in a best efforts format for at least the minimum time period.

8. The method of claim 7 wherein adjusting further comprises reducing the quality of audio information in the audio frame to increase the time interval.

9. An information handling system comprising:
   a processor operable to generate audio information;
   a wireless network device interfaced with the processor and operable to communicate the audio information through a wireless network to plural audio endpoints, the plural audio endpoints operable to present audio sounds in synchronization with each other; and
   a backoff module stored in non-transitory memory and configured to execute on a processor, the backoff module interfaced with the wireless network device, the backoff module operable to define periodic time intervals at the wireless network, the periodic time intervals for communication of the audio information, the backoff module further operable to communicate data in a best efforts format outside the periodic time intervals;

wherein each periodic time intervals communicates a single audio frame having an audio slot for each of the plural audio endpoints.

10. The information handling system of claim 9 wherein the audio information comprises plural audio frames, each of the plural audio frames having plural synchronized audio slots with one slot for use by each of the plural audio endpoints, one audio frame sent during each periodic time interval.

11. The information handling system of claim 10 wherein the audio endpoints comprise stereo speakers.

12. The information handling system of claim 11 wherein the wireless network device comprises an antenna system that communicates both the audio frame and data.

13. The information handling system of claim 9 wherein the backoff module is further operable to set a minimum time for communication of data in a best efforts format.

14. The information handling system of claim 13 wherein the backoff module sets a minimum time for communication of data in the best efforts format by setting a maximum audio frame length associated with a predetermined audio quality.

15. The information handling system of claim 14 wherein the wireless network comprises a wireless local area network.

16. A method for communicating audio frames and best efforts data through a common antenna system, the method comprising:

defining a periodic time interval having a length sufficient to communicate a frame of audio information, the frame having a slot for each of plural audio endpoints;

communicating audio information with plural periodic time intervals, each periodic time interval communicating a single audio frame;

restricting communication through the common antenna system to the audio information during each of the plural periodic time intervals until the audio frame of the periodic time interval is communicated;

presenting audio in stereo at the plural audio endpoints with the audio information; and communicating best efforts data through the common antenna system within each of the plural periodic time intervals after the communicating of the audio frame in each periodic time interval.

17. The method of claim 16 wherein the predetermined periodic intervals correspond to a sample rate of the audio information.

18. The method of claim 16 wherein the antenna communicates through a wireless local area network.

* * * * *